United States Patent [19]

De Filippis

[11] Patent Number: 4,609,137

[45] Date of Patent: Sep. 2, 1986

[54] UNIT FOR ASSEMBLY OF A MOTOR VEHICLE BODY ELEMENT

[75] Inventor: Christian De Filippis, Evry Grecy S/Yerres, France

[73] Assignee: Renault Automation, Boulogne-Billancourt, France

[21] Appl. No.: 619,993

[22] Filed: Jun. 12, 1984

[30] Foreign Application Priority Data

May 29, 1984 [FR] France .................... 84 08379

[51] Int. Cl.$^4$ ............................................. B23K 37/04
[52] U.S. Cl. ..................................... 228/47; 198/345; 219/79
[58] Field of Search ................. 228/47; 198/345, 346; 219/79, 80

[56] References Cited

U.S. PATENT DOCUMENTS 3,527,087  9/1970  Converse, III ................. 198/345 X
4,442,335  4/1984  Rossi ........................... 228/4.1 X
4,448,341  5/1984  Fujikawa ........................ 228/47 X Primary Examiner—Kenneth J. Ramsey
Attorney, Agent, or Firm—Oblon, Fisher, Spivak, McClelland & Maier

[57] ABSTRACT

A unit for assembly of an approximately plane, large-sized motor vehicle body element of the type including a plurality of work stations (P1-P6) between which the element is successively transferred by a lengthwise transfer device (12), wherein at each work station the body element is located in a plane (PC) forming a predetermined angle ($\alpha$) in relation to the horizontal plane on which the assembly unit rests. The lengthwise transfer device (12) includes a transfer mechanism with drive bars located in a plane (PT) forming a predetermined angle ($\alpha'$) in relation to the horizontal plane equal to the predetermined angle.

8 Claims, 5 Drawing Figures

UNIT FOR ASSEMBLY OF A MOTOR VEHICLE BODY ELEMENT

BACKGROUND OF THE INVENTION

1. Field of the Invention

This invention has as its object a unit for assembly of a motor vehicle body element and relates more particularly to the automated assembly on a transfer line of an approximately plane large-sized body element.

2. Discussion of the Background

Assembly of a large-sized motor vehicle body element, such as, for example, a side panel, requires that various operations such as, for example, numerous welding tacks be performed either by a robot or manually in a succession of work stations. It is easy to understand that making numerous tacks on a large-sized, approximately plane element is very difficult when these tacks are distributed over the periphery of the body element and the latter is positioned in a horizontal plane approximately parallel to the floor; these difficulties in access have numerous drawbacks both in terms of the safety of personnel making the tacks farthest from the position that he occupies and in terms of welding robots that must operate over great distances. The necessity of transferring the body element successively from one work station to the next with a lengthwise transfer device such as, for example, a bar transfer device so far has required the body element to be kept in a plane parallel to the horizontal plane of the floor with all the accompanying drawbacks that have just been mentioned.

SUMMARY OF THE INVENTION

To solve this problem, the invention proposes an assembly unit characterized in that at each work station the body element is located in a plane forming a determined angle in relation to the horizontal plane on which the assembly unit rests.

According to another characteristic of the invention, at each work station the body element is located in a plane forming the same determined angle in relation to the horizontal plane on which the assembly unit rests.

To make the transfer from one station to the next, the lengthwise transfer device comprises a bar transfer type whose drive bars are located in a plane forming a determined angle in relation to the horizontal plane of the floor.

According to the invention, each work station is provided with a lifting device making it possible to move the body element in a direction perpendicular to the general plane of the element between an upper work position and an intermediate transfer position in which the body element rests on a transfer structure connected to said transfer bars. The lifting device comprises a vertical jack at the end of which is mounted a reaction structure on which the body element is kept supported when it is in its upper work position. The lifting device can also move axially short of the intermediate transfer position to a lower position in which said reaction structure is retracted beneath said transfer structure to allow the lengthwise transfer of the body element from one work station to another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
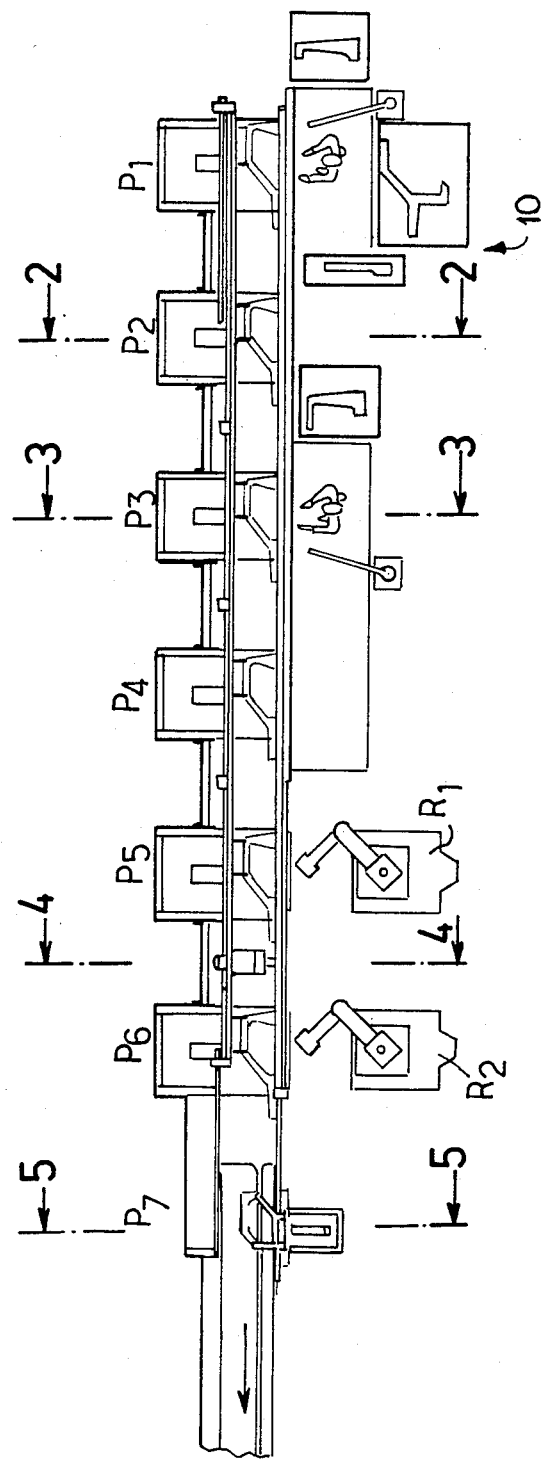
FIG. 1 is a top view of a seven station assembly unit made according to the teachings of this invention.

FIG. 1 shows a unit for assembly of a side panel of a motor vehicle body. Assembly unit 10, which is shown, comprises six work stations indicated by P1 to P6. The first station P1 is a station for manual loading, by an operator, of three elements a, b and c consisting of an approximately plane, large-sized motor vehicle body element. By approximately plane element is understood a body element whose group of components are located approximately in a plane of reference.

Station P2 here is a dead station that can be used in other applications requiring the addition of supplementary constitutive elements of the body element which it is desired to assemble.

Figure 3:
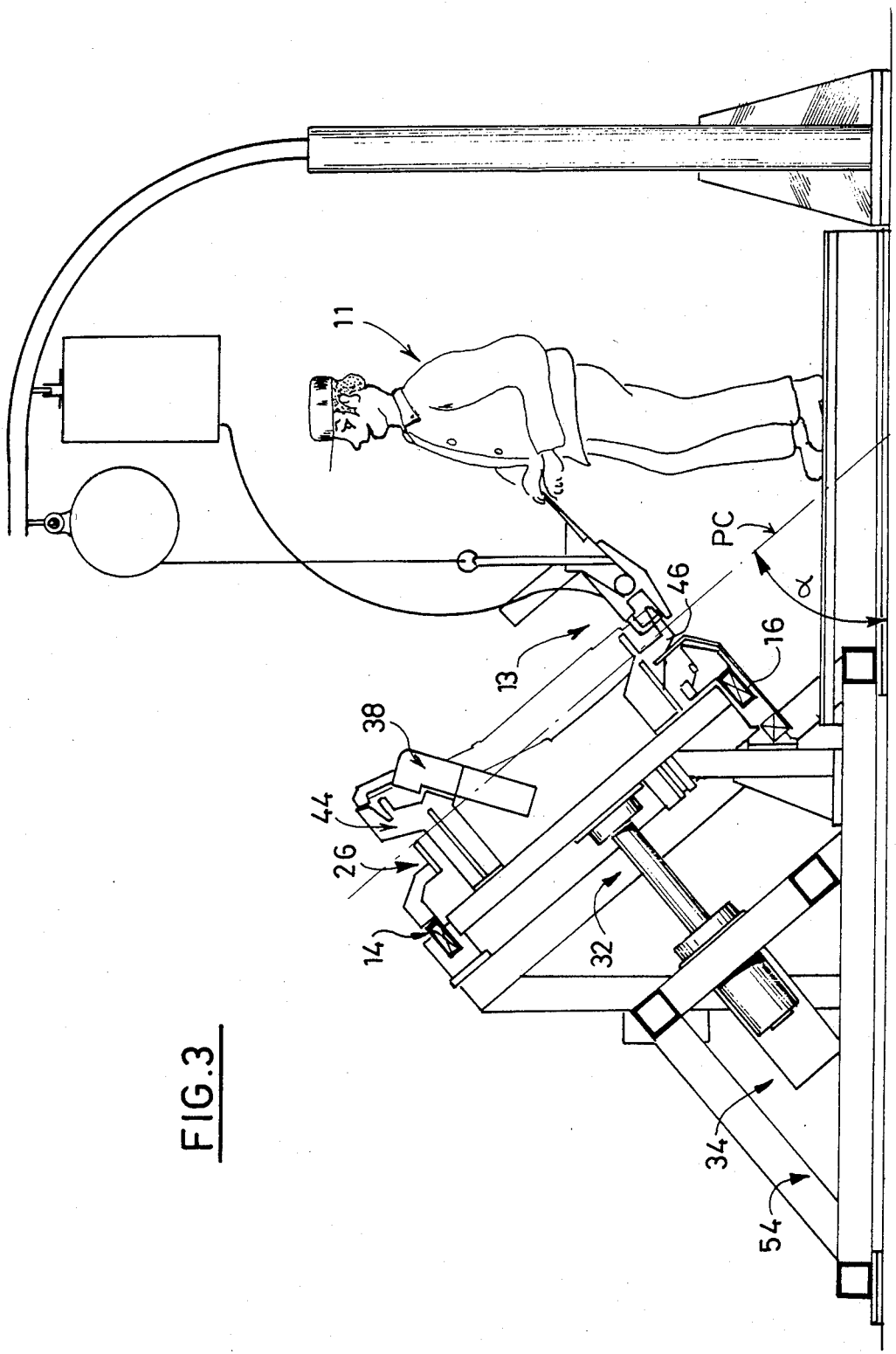
FIG. 3 is a partial section taken along line 3—3 of FIG. 1 passing through the median plane of the work station indicated by reference P3.

Station P3 is a station for loading the last element d constituting the body element and also a manual welding station at which operator 11, shown in FIGS. 1 and 3, with welding tongs 13 making 18 tacks distributed over the body element to be assembled.

Station P4 is a station for control and possible pickup. Station P5 and station P6 are two automated welding stations at which two robots R1 and R2 each make 30 tacks on the body element. Finally, station P7 is a station for discharge of the body element which has just been assembled.

To transfer the body element successively from one work station to the next, the assembly unit comprises a transfer device 12 of the bar transfer type.

According to this invention, the approximately plane body element is located in a geometric plane, or body plane PC, forming a predetermined angle $\alpha$ in relation to the horizontal plane made by the floor on which the assembly unit rests.

According to the invention, and to make it possible to use a bar transfer, at each work station as can be seen in FIGS. 2 to 5, the body element is located in a plane PC forming the same predetermined angle $\alpha$ in relation to the floor.

Lengthwise bar transfer 12 is a transfer whose two drive bars 14 and 16 are located in a geometric plane, or transfer plane PT parallel to body plane PC and therefore form with the floor a determined angle $\alpha'$ equal to the angle $\alpha$ mentioned above.

Figure 4:
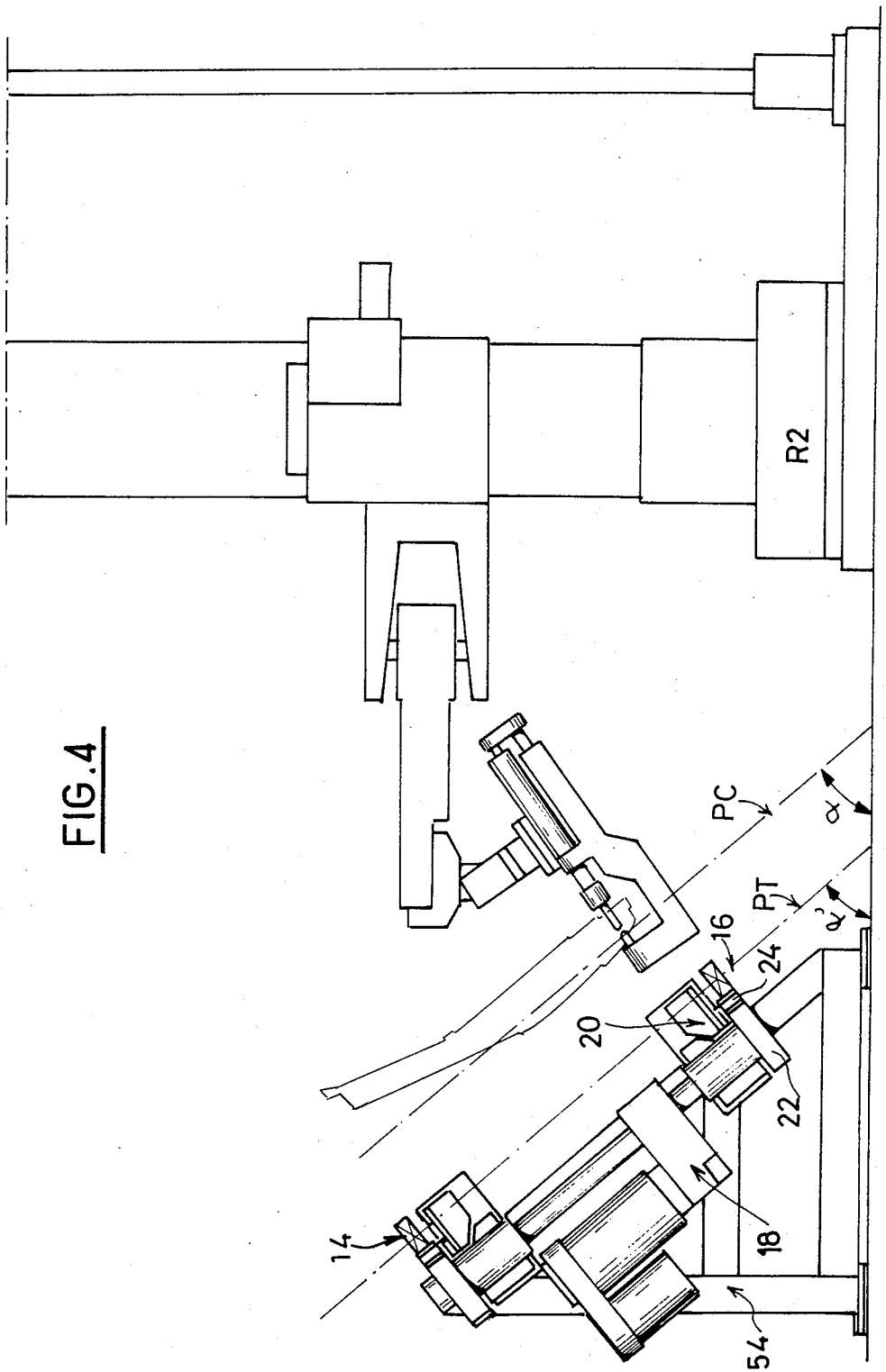
FIG. 4 is a section taken along line 4—4 of FIG. 1 passing through the median plane of the bar transfer drive device of FIG. 1 and in which robot R2 can also be seen occupying the work station indicated by P6.

As can be seen particularly in FIGS. 3 and 4, thanks to the inclination of the plane in which is located the body element on which the welding operations are to be performed, these latter are made very easy and the operator shown in FIG. 3 or robot R2 shown in FIG. 4 can make the various tacks without having to move over very great distances. The operator particularly does not have to bend over the work station, the group of points on the periphery of the body element being able to be reached by simple movements of his arms.

The drive of the drive bars of the transfer, shown in FIG. 4, is of a known type and essentially comprises a geared motor—brake unit 18 which with a roller box 20 drives a pinion 22 and a rack 24. Upper drive bar 14 is driven symmetrically by a device identical with that just described for lower drive bar 16.

Actual driving of the body element, shown in outline in FIGS. 2 to 5, is done by a transfer structure 26. Transfer structure 26 consists essentially of upper transfer followers 28 and lower transfer followers 30 connected respectively to the upper and lower transfer bars 14 and 16. This transfer structure 26 moves with transfer bars 14 and 16 to move the body element from one work station to the next.

According to the invention, each work station is provided with a lifting device 32 making it possible to move the body element in a direction D perpendicular to general plane PC of the body element between an upper work position and an intermediate transfer position in which the body element rests on transfer structure 26.

Lifting device 32 comprises an axial jack 34 at the end of which is mounted a reaction structure 36 on which the body element is kept in position by clamping means 38 and 40 when the body element is in its upper work position. The lifting device unit 32, 34 and 36 has been shown in solid lines in FIG. 2 in its upper work position. In this position, the body element is kept clamped by clamping devices 38 and 40 in reaction structure 36 which essentially comprises a lifting frame 42 on which are fastened bezel-like supports 44 and 46. The reaction structure made up of elements 42, 44 and 46 constitutes a positioning jig for the body element on which the latter is positioned and kept supported.

Figure 2:
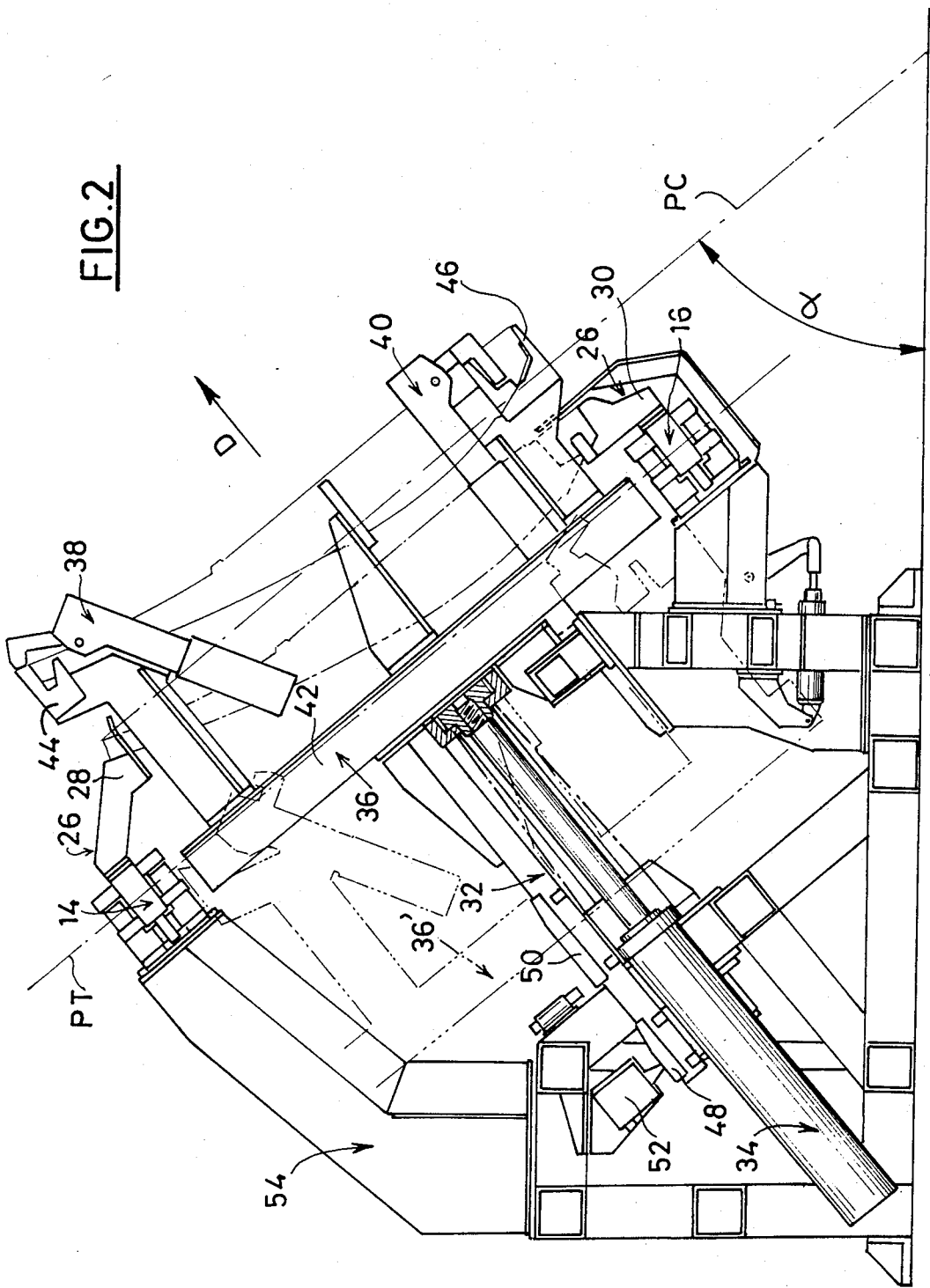
FIG. 2 is a partial view taken along line 2—2 of FIG. 1 passing through the median plane of one of the work stations indicated by reference P2.

FIG. 2, besides showing the second representation in outline of the body element supported on its transfer structure 26, also shows in outline the reaction structure unit 36' shown in its lower position. Actually, according to the invention, lifting device 32 can move axially parallel to direction D short of the intermediate transfer position in which the body element comes into position on transfer structure 26 to a lower position in which reaction structure 36 is retracted below transfer structure 26 to allow lengthwise transfer of the body element from one work station to the next.

Operation of hydraulic jack 34 which assures the drive of lifting device 32 is assured by a group of cams 48, 50 of valves and contact 52 which will not be described more in detail here.

The assembly of lifting devices equipping each of work stations P1 to P6 and the transfer bars and their drive devices are fastened to an overall frame of the assembly unit consisting of an assembly 54 of steel structural work assembled and welded together.

The structure of the lifting devices equiping stations 1 to 6 of the assembly unit which has just been described makes it possible to see that assembly of the upper face of the assembly unit is entirely disengaged to allow as easily as possible performing all the operations aimed at assembling the body element, all of the equipment inherent in transferring and placing of the body element at each of the work stations being eliminated in the lower part of the assembly unit, i.e., below transfer plane PT where the transfer bars are located.

Figure 5:
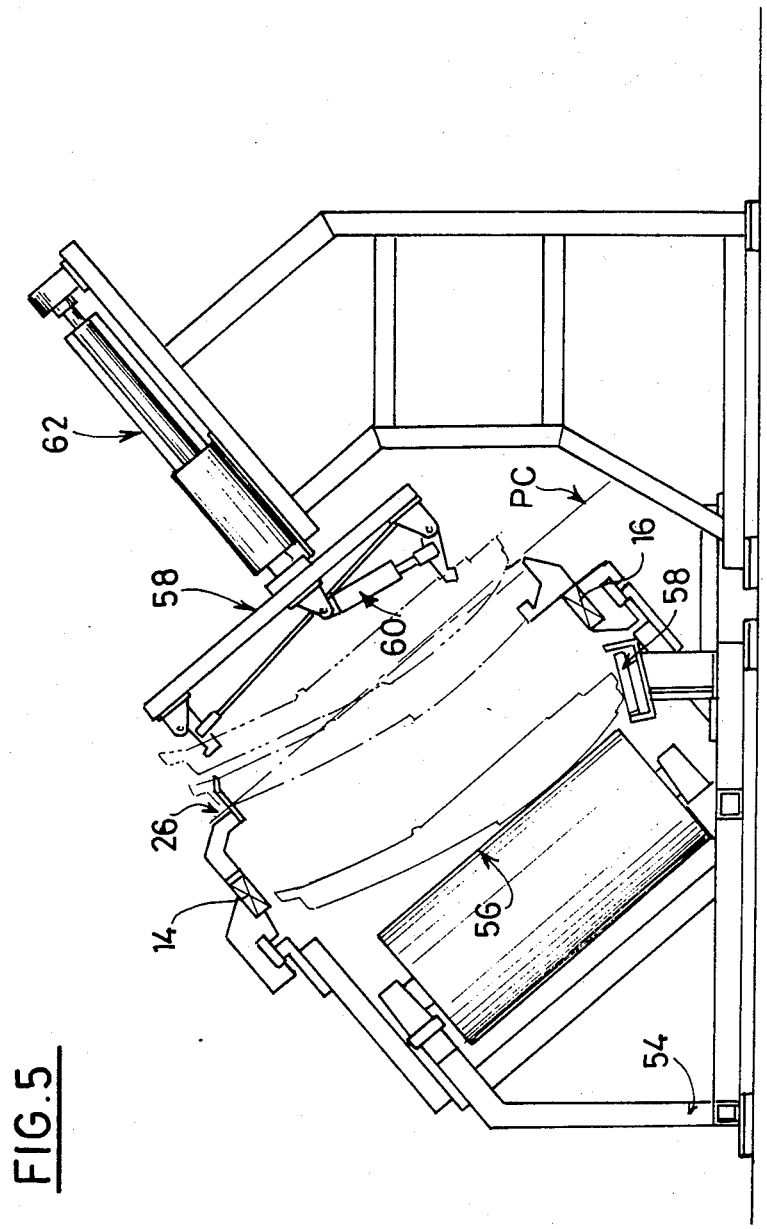
FIG. 5 is a view in section taken along line 5—5 of FIG. 1 passing through the median plane of discharge station indicated by P7.

Discharge station P7 will now be described with reference more particularly to FIG. 5. Discharge of the body elements whose assembly has just been performed at stations P1 to P6 is performed on a conveyor belt 56 located in the lower position, i.e., below transfer plane PT. The body element, as shown in outline in low position in FIG. 5, rests on conveyor belt 56 and on conveyor rollers 58 to allow its removal parallel to the general direction of transfer and in the extension of the transfer.

To enable the assembled body element to be placed on conveyor belt 56, discharge station P7 is equipped with a device 58 for gripping and placing whose operation is assured by a jack 60 and mechanical returns making it possible to assure gripping and release of the assembled body element. Gripping device 58 is connected to a control jack 62 whose axial movement, in a direction parallel to the direction of movement D of each of lifting devices 32 equipping stations P1 to P6, makes it possible to move the body element parallel to its general plane. These movements are performed from the transfer position, in which the body element rests on transfer structure 26, first, to an upper position shown in FIG. 5 in which the transfer can be retracted, and, second, to a low position in which the body element can be placed on conveyor belt 56.

The invention is not limited to the embodiment just described; both the number of work stations and the detail of the operations performed at them can vary without going outside the scope of the invention.

Also, the structure of discharge station P7 can be modified in case it is desired to place the assembled element on a horizontal conveyor belt that is no longer inclined; in this case, the control jack no longer moves the body element parallel to its plane but pivots the latter to deposit it horizontally.

Obviously, numerous modifications and variations of the present invention are possible in light of the above teachings. It is therefore to be understood that within the scope of the appended claims, the invention may be practiced otherwise than as specifically described herein.

I claim:

1. An assembly unit for assembling an approximately plane, large-sized motor vehicle body element of the type comprising a plurality of work stations (P1-P6) between which the element is successively transferred by a lengthwise transfer device, and means located at each work station for locating the body element in a plane (PC) forming a first predetermined angle ($\alpha$) in relation to the horizontal plane on which the assembly unit rests wherein at least one of said work stations further comprises a lifting device for moving the body element in a direction (D) perpendicular to the general plane of the element between an upper work position and an intermediate transfer position in which said body element rests.

2. An assembly unit according to claim 1, further comprising at each work station clamp means for locating the body element in a plane (PC) forming said first predetermined angle ($\alpha$).

3. An assembly unit according to claim 2, wherein the lengthwise transfer device further comprises a plurality of drive bars and which includes means for locating said drive bars in a plane (PT) forming a second predetermined angle ($\alpha'$) in relation to the horizontal plane.

4. An assembly unit according to claim 1, wherein the lifting device further comprises an axial jack having a reaction structure mounted on an end of said axial jack and on which the body element is held supported when the latter is in a work position.

5. An assembly unit according to claim 4, further comprising means for moving the lifting device to a lower position in which said reaction structure is retracted below said transfer structure to allow lengthwise transfer of the body element from one of said work stations to a second of said work stations.

6. An assembly unit according to claim 1, wherein said plurality of working stations further comprises at least one welding station (P5, P6) which includes a robot (R1, R2) for making a plurality of tacks.

7. An assembly unit according to claim 1, further comprising a station (P7) for discharge by conveyor belt (56), a device upon which said assembled element is placed for gripping the elment in an upper work position and a control jack (62) for placing the assembled element in lower position on the conveyor belt.

8. An assembly unit according to claim 1, further comprising a transfer structure connected to said transfer bars and on which said body element rests.

* * * * *